(12) United States Patent
Beyabani et al.

(10) Patent No.: US 8,266,665 B2
(45) Date of Patent: Sep. 11, 2012

(54) TV SCREEN CAPTURE

(75) Inventors: Syed Zafar Beyabani, Irving, TX (US);
Siddharth Pandey, Irving, TX (US);
Ruchir Rodrigues, Irving, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 613 days.

(21) Appl. No.: 12/054,787

(22) Filed: Mar. 25, 2008

(65) Prior Publication Data

US 2009/0245747 A1    Oct. 1, 2009

(51) Int. Cl.
*H04N 7/173* (2011.01)
*H04N 7/16* (2011.01)

(52) U.S. Cl. .................. 725/109; 725/131; 725/139

(58) Field of Classification Search .................. None
See application file for complete search history.

(56) References Cited

U.S. PATENT DOCUMENTS

| | | | |
|---|---|---|---|
| 7,707,612 B2 * | 4/2010 | Frisco et al. | 725/76 |
| 2004/0244056 A1 * | 12/2004 | Lorenz et al. | 725/135 |
| 2007/0101353 A1 * | 5/2007 | Jeong et al. | 725/13 |
| 2007/0162932 A1 * | 7/2007 | Mickle et al. | 725/37 |
| 2007/0283401 A1 * | 12/2007 | Lee et al. | 725/107 |
| 2008/0098432 A1 * | 4/2008 | Hardacker et al. | 725/51 |
| 2008/0109866 A1 * | 5/2008 | Thomas et al. | 725/139 |
| 2008/0244637 A1 * | 10/2008 | Candelore | 725/28 |
| 2008/0301730 A1 * | 12/2008 | Huang | 725/38 |
| 2009/0064259 A1 * | 3/2009 | Wang et al. | 725/131 |

* cited by examiner

*Primary Examiner* — Chris Parry

(57) ABSTRACT

A method may include receiving, by a video client, a screen capture request, determining a type of screen capture, generating screen capture type information based on a result of determining the type of screen capture, analyzing at least one of screen capture data or screen capture type information, and providing a service to a user of the video client based on the analysis of the at least one of screen capture data or screen capture type information.

22 Claims, 7 Drawing Sheets

TV SCREEN CAPTURE

BACKGROUND

Typically when a television viewer encounters a problem with television reception, the television viewer may contact his or her television service provider by telephone. In turn, the television service provider may have the television viewer describe the problem (e.g., what is displayed on the television) and perform one or more operations (e.g., turn off the set-top box (STB), unplug the STB, etc.) to correct the problem. Depending on the outcome of the corrective measures taken, the television service provider may send a technician to the television viewer's home. However, this approach of correcting television problems can be an inefficient process (e.g., monetarily, time wise, etc.) for both the television viewer and the television service provider.

DETAILED DESCRIPTION OF PREFERRED EMBODIMENTS

The following detailed description refers to the accompanying drawings. The same reference numbers in different drawings may identify the same or similar elements. Also, the following description does not limit the invention.

The term "may" is used throughout this application and is intended to be interpreted as "having the potential to," "being configured to," or "being able to", and not in a mandatory sense (e.g., as "must"). The term "component," is intended to be broadly interpreted to include software, hardware, or a combination of hardware and software. The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Implementations described herein may provide a system that captures a television screenshot and transmits the television screenshot to a television service provider for analysis and/or corrective action. Additionally, or alternatively, the system described herein may capture a television screenshot that may be used for other purposes (e.g., entertainment, etc.).

Figure 1:
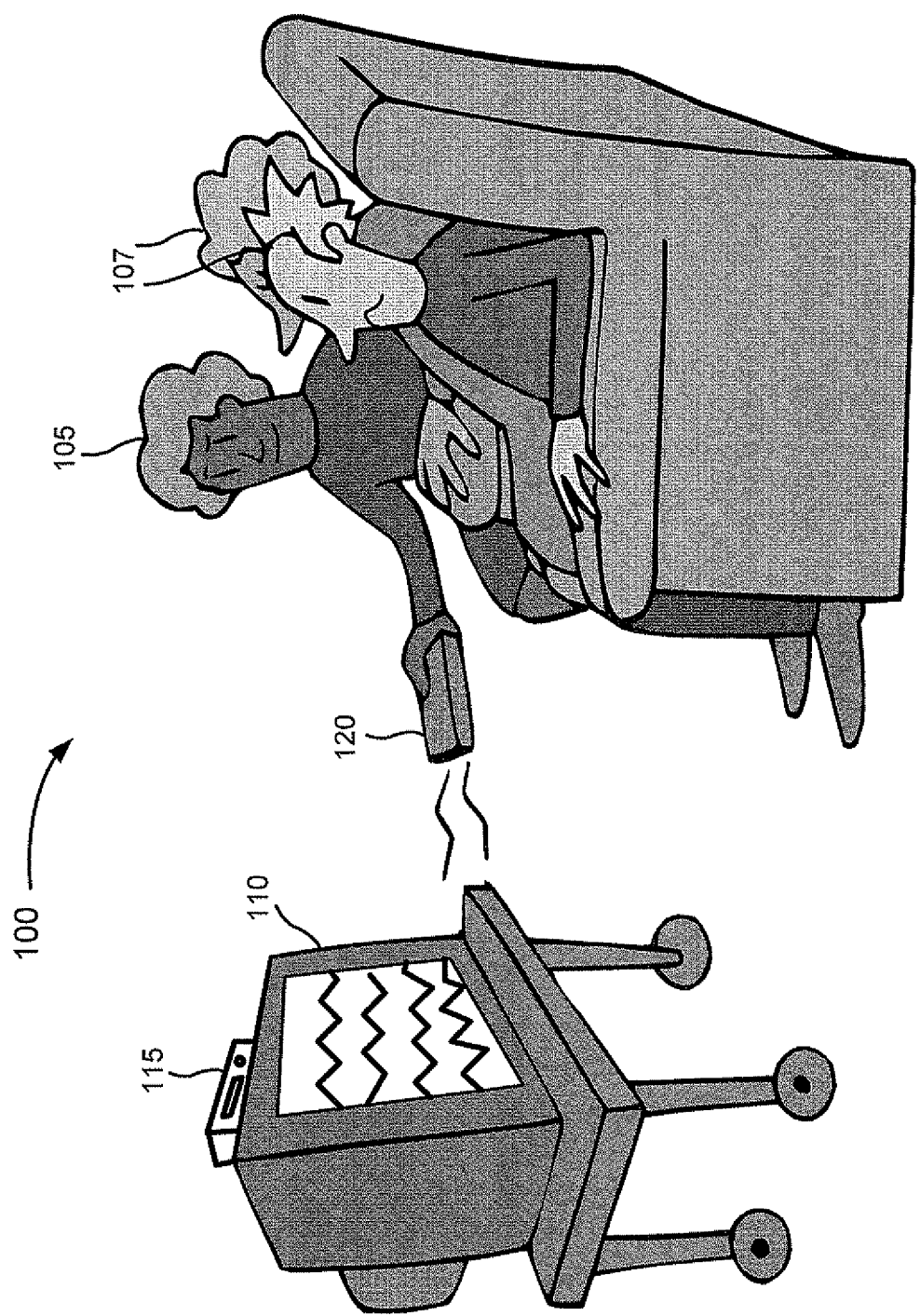
FIG. 1 is a diagram illustrating concepts described herein.

FIG. 1 is a diagram illustrating an exemplary environment 100. As illustrated, exemplary environment 100 may include a user 105, friends 107, a television 110, a set top box (STB) 115, and a television remote control 120. For purposes of discussion, assume that user 105 is trying to watch her favorite program on television 110 with her friends 107. However, the television reception is not working properly. In such an instance, user 105 may, for example, press a button on television remote control 120 to capture a television screenshot. The television screenshot may be transmitted to a backend component (e.g., a network device—not illustrated) of a television service provider network. The television screenshot may, among other things, allow the television service provider to troubleshoot the problem, correct the problem, and/or or take some other type of remedial measures (e.g., send a technician).

As a result of the foregoing, environment 100 may, among other things, provide the capability of allowing a user to capture a television screenshot and utilize this information to resolve television issues. Since environment 100 has been partially described, variations to the above concepts will be discussed further below.

Figure 2:
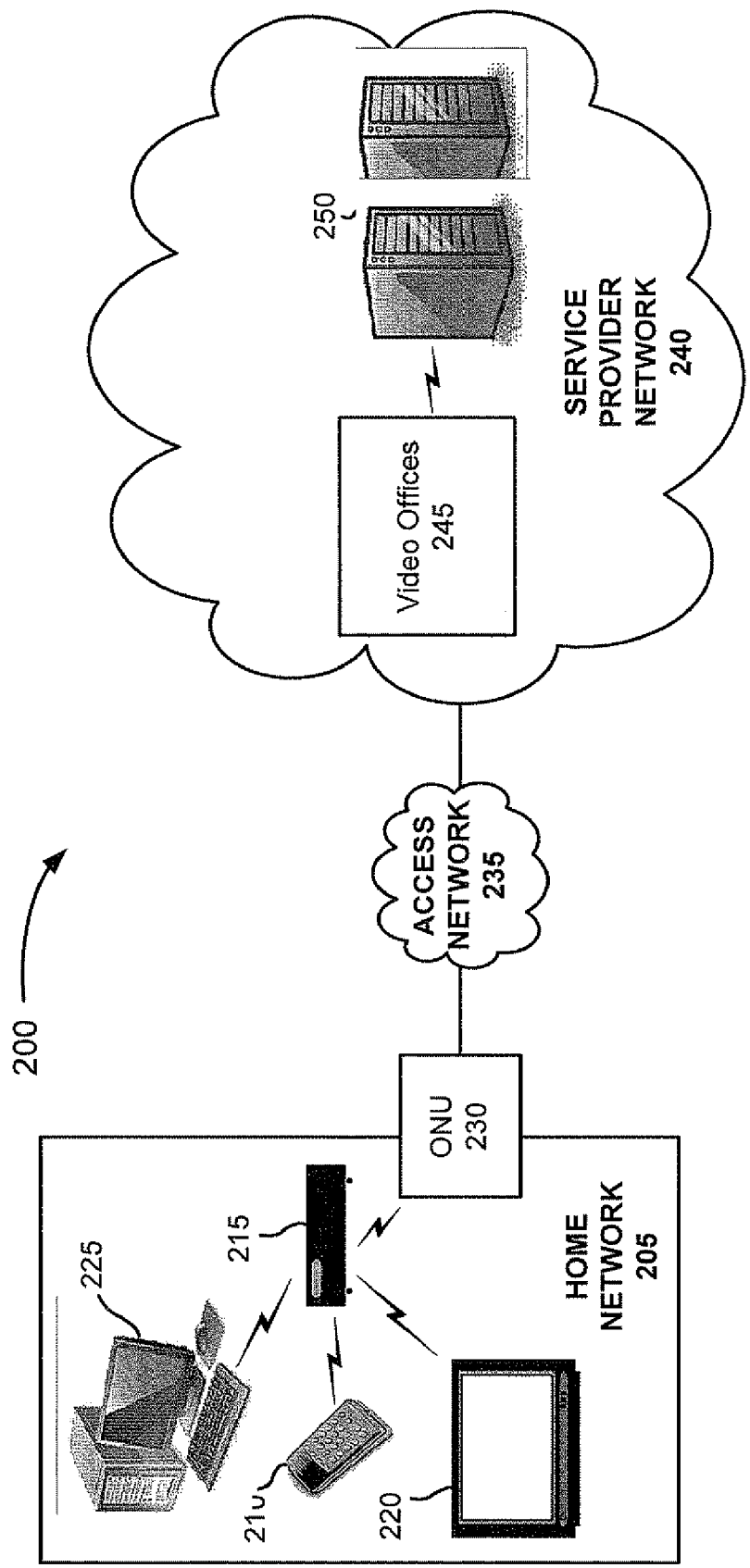
FIG. 2 is a diagram illustrating an exemplary environment in which systems and methods described herein may be implemented.

FIG. 2 is a diagram illustrating an exemplary environment 200 in which systems and methods described herein may be implemented. As illustrated, environment 200 may include home network 205, access network 235, and service provider network (SPN) 240. Home network 205 may include a remote control 210, a video client 215, a display 220, a computer system 225, and an optical network unit (ONU) 230. SPN 240 may include, among other things, video offices 245 and screen capture server 250.

Remote control 210 may include a device capable of remotely controlling the operation of video client 215 and/or display 220. Remote control 210 may transmit signals, such as infrared signals, to a reader associated with video client 215 and/or display 220.

Video client 215 may include a device capable of receiving, transmitting and/or processing information to and from access network 235. Video client 215 may provide video signals to display 220. In some instances, video client 215 may provide multi-room service. For example, video client 215 may communicate (e.g., video signals, television screenshots, music, etc.) with display 220, computer system 225, and/or other video clients and/or displays (not illustrated), etc., in home network 205.

Video client 215 may include decoding and/or decryption capabilities. Video client 215 may include a digital video recorder (DVR) (e.g., a hard drive). Video client 215 may include components, to be described below, for performing television screen capture. Video client 215 may be capable of receiving input from a user directly (e.g., a button on video client 215) or indirectly (e.g., via remote control 210).

In one implementation, video client 215 may include a STB. In another implementation, video client 215 may include a computer device, a cable card, a TV tuner card, a stationary device (e.g., a telephone or a computer), or a portable device (e.g., a mobile telephone or a PDA).

Display 220 may include a device capable of receiving and reproducing video signals. In one implementation, display 220 may include a television. In other implementations, display 220 may include, for example, a display of a stationary communication device (e.g., a computer monitor or a telephone), or a display of a portable communication device (e.g., a mobile telephone or a personal digital assistant (PDA)). Display 220 may connect to video client 215 in a wired or wireless manner.

Computer system 225 may include a computational device, such as a desktop computer, a laptop computer, etc., with peripheral devices (e.g., a display, a mouse, a keyboard, etc.). Computer system 225 may include one or more components for communicating with video client 215. Computer system 225 may connect to video client 215 in a wired or wireless manner.

ONU 230 may include a device capable of providing an interface between home network 205 and access network 235. For example, ONU 230 may convert optical signals to electrical signals, as well as other functions, such as multiplexing/demultiplexing, coding/decoding, modulating/demodulating, etc. ONU 230 may include channel plug-in units that provide a narrowband interface to customer premises equipment in home network 205. ONU 230 may also connect to access network 235 (e.g., to central office (CO) equipment).

Access network 235 may include a video signaling and distribution network and system. Additionally, access network 235 may include, among other things, firewall, filtering, proxy, and/or network address translation mechanisms. Access network 235 may include, for example, a single network, such as a wide area network (WAN), a local area network (LAN), a telephone network (e.g., a public switched telephone network (PSTN) or a wireless network), the Internet, a satellite network, etc., or a combination of networks. Access network 235 may provide home network 205 with video content from SPN 240.

SPN 240 may include a video signaling and distribution network. Video offices 245 may include video hub offices. For example, video hub offices may include broadcast systems and content for distribution, such as video-on-demand (VOD), an interactive program guide (IPG), and regional content. VOD may include content such as movies, television programs, sports programs, special interest programs, and/or educational programs that may be viewed by a subscriber upon request (i.e., on-demand). IPG may include, for example, a listing and/or a schedule of programs available for viewing. Regional content may include, for example, news programs, independent channel programming, movies, sports programs, religious programs, music, and/or commercials.

Additionally, video offices 245 may include, for example, a super headend. Super headend may include broadcast systems and content for distribution. For example, super headend may include broadcast systems to acquire, aggregate and distribute national content to video hub offices. National content may include, for example, television programs, movies, premier channel programming, news programs, sports, religious programs, music, and/or commercials.

Screen capture server 250 may include a device capable of performing one or more of the operations associated with the concepts described herein. For example, screen capture server 250 may include a computational device, such as a computer. Screen capture server 250 may include mass storage devices.

As will be described below, screen capture server 250 may, among other things, process screen capture data originating from home network 205. Screen capture server 250 may process the screen capture data when, for example, a user activates a screen capture mechanism on video client 215. Video client 215 may forward the screen capture data to screen capture server 250. Additionally, or alternatively, screen capture server 250 may forward the screen capture data to other devices in SPN 240 and/or forward the screen capture data to other devices not within SPN 240 (e.g., the Internet).

Although, FIG. 2 illustrates exemplary environment 200, in other implementations, environment 200 may include fewer, additional, and/or different devices than the devices depicted in FIG. 2. For example, in other implementations, environment 200 may not include computer system 225 and/or ONU 230. Additionally, or alternatively, depending on the type of video client 215 and/or display 220 (i.e., a STB and television versus a mobile phone with a display), devices different than and/or additional to the devices depicted in environment 200 may be included. Additionally, or alternatively, in other implementations, devices may be combined into a single device. For example, video client 215 and display 220 may be combined into a single device, or remote control 210 and display 220 may be combined into a single device. Additionally, or alternatively a device may be implemented as two or more devices. For example, home network 205 may include multiple video clients 215 having a master/slave relationship or a peer-to-peer relationship.

It will be appreciated that one or more functions performed by video client 215 may be performed by another device. For example, screen capture server 250 may perform one or more of the functions performed by video client 215, and/or some other device in, for example, SPN 240. Additionally, or alternatively, it will be appreciated that environment 200 may include a different arrangement and/or configuration than the arrangement and configuration depicted in FIG. 2. For example, while screen capture server 250 has been illustrated as a distinctive device from video offices 245, screen capture server 250 may be included with video offices 245. While the connections between devices in environment 200 are illustrated as being direct, in practice, any one of these connections may be indirect.

Figure 3:
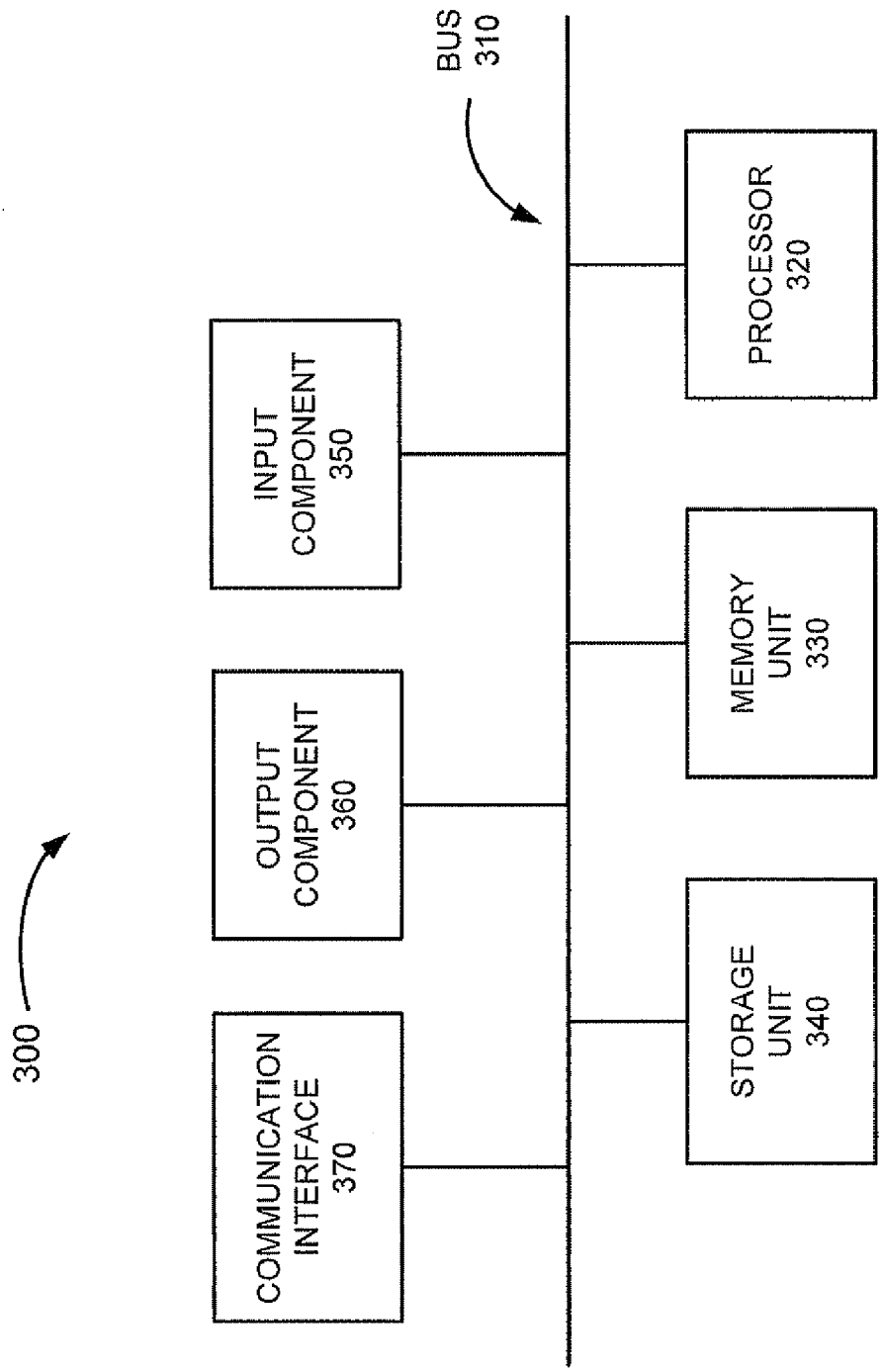
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIG. 2. For example, device 300 may correspond to remote control 210, video client 215, display 220, computer system 225, ONU 230, and/or screen capture server 250. As illustrated, device 300 may include a bus 310, a processor 320, a memory unit 330, a storage unit 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or processing logic that may interpret and execute instructions. "Processing logic," as used herein, may include hardware, software, or a combination of hardware and software.

Memory unit 330 may include any unit that stores data and/or instructions related to the operation and use of device 300. For example, memory unit 330 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage unit 340 may include any unit that stores data, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device.

Memory unit 330 and/or storage unit 340 may also include a storing unit external to and/or removable from device 300, such as a Universal Serial Bus (USB) memory stick, a hard disk, etc.

Input component 350 may include a mechanism that permits a user to input information to device 300, such as a keyboard, a keypad, a mouse, a button, a switch, a microphone, voice recognition logic, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like.

As will be described in detail below, device 300 may perform certain operations relating to the system and methods described herein. Device 300 may perform these operations in response to processor 320 executing software instructions contained in a computer-readable medium, such as memory unit 330.

The software instructions may be read into memory unit 330 from another computer-readable medium or from another device via communication interface 370. The software instructions contained in memory unit 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
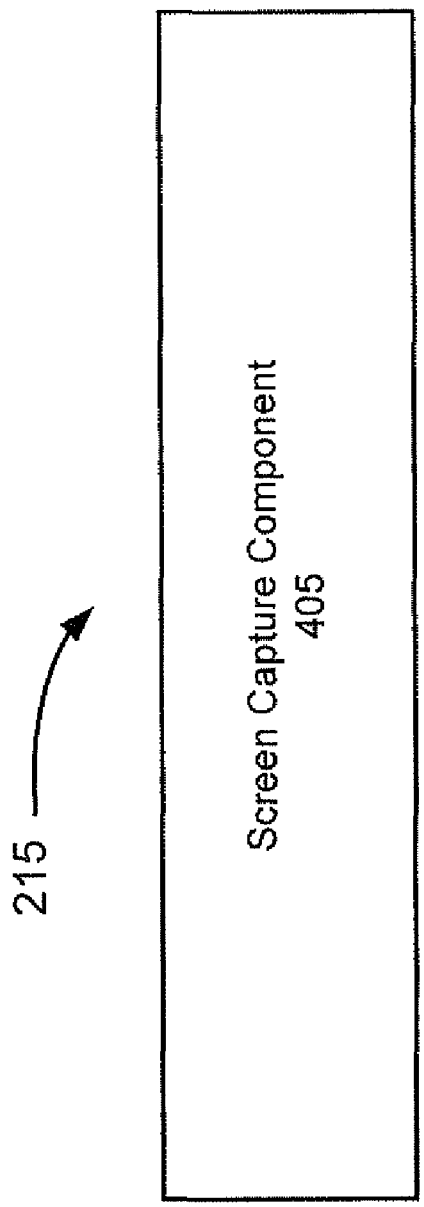
FIGS. 4 and 5 are diagrams illustrating exemplary components that may be associated with one or more devices depicted in FIG. 2.

FIG. 4 is a diagram illustrating a screen capture component 405 that may be included with device 300. For example, video client 215 may include screen capture component 405.

Screen capture component 405 may include a component for capturing a screenshot. For example, screen capture component 405 may include a video capture ASIC. Screen capture component 405 may capture a screenshot (or multiple screenshots) based on an activation signal received by video client 215. For example, a user may press a button on remote control 210 or on video client 215. In such an instance, screen capture component 405 may perform a video capture process. The video capture process may include obtaining screen capture data.

Screen capture component 405 may also include a component for determining a type of screen capture data. For example, the screen capture data may correspond to troubleshooting or entertainment. Screen capture component 405 may determine whether the screen capture data corresponds to troubleshooting or entertainment based on one or more criteria (e.g., input received, failure detection processes, favorite lists, etc.), as will be described in greater detail below with respect to FIG. 6.

Screen capture component 405 may also forward the screen capture data to a backend component. For example, screen capture component 405 may forward the screen capture data via communication interface 370 to screen capture server 250. In one implementation, screen capture component 405 may package the screen capture data in a packet or some other data container/unit. Screen capture component 405 may generate a flag, a descriptor, an identifier and/or other attribute information (e.g., event level tracking information) to indicate the type of screen capture data.

As will be described below, the screen capture data may be utilized for different purposes. For example, in one implementation, the screen capture data may be utilized for troubleshooting and/or remedial measures associated with a television-related problem. Additionally, or alternatively, the screen capture data may be utilized for entertainment purposes. For example, a user may desire to capture one or more screenshots of his or her favorite television program, music video, etc.

Although FIG. 4 illustrates an exemplary screen capture component 405 that may be associated with video client 215, in other implementations, one or more devices of environment 200 may perform one or more functions described as being performed by screen capture component 405. Additionally, or alternatively, screen capture component 405 may be included within a device other than, or in addition to, video client 215. For example, screen capture server 250 may include screen capture component 405 to perform one or more of the functions described herein.

Figure 5:
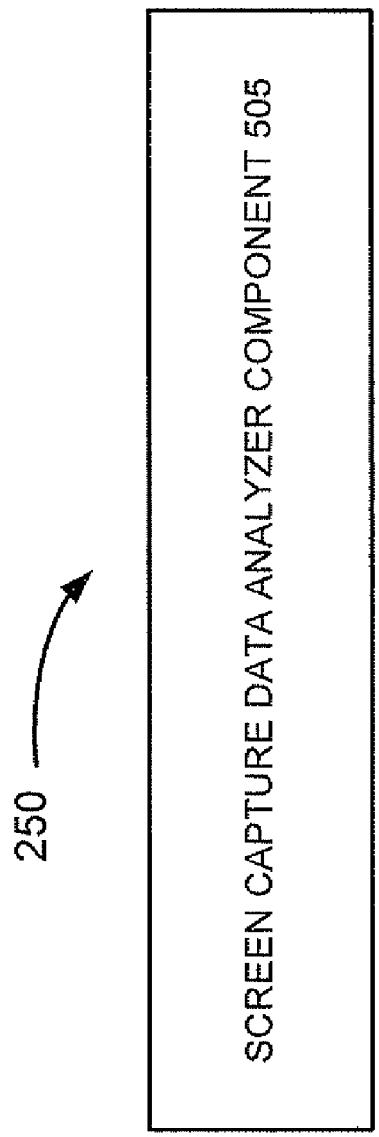

FIG. 5 is a diagram illustrating an exemplary screen capture data analyzer component 505 that may be included with device 300. For example, screen capture server 250 may include screen capture data analyzer component 505.

Screen capture data analyzer component 505 may include a component that analyzes screen capture data. For example, screen capture data analyzer component 505 may identify the type of screen capture data (e.g., screen capture data corresponding to troubleshooting or screen capture data corresponding to entertainment) based on a flag, a descriptor, an identifier and/or other attributes (e.g., event level tracking) associated with the screen capture data. In other implementations, screen capture data analyzer component 505 may identify the type of screen capture data based on the screen capture data itself. Depending on the outcome of the analysis, screen capture server 250 may archive the screen capture data and/or forward the screen capture data to another device, as will be described in further detail with respect to FIG. 6.

Although, FIG. 5 illustrates an exemplary screen capture data analyzer component 505 that may be associated with screen capture server 250, in other implementations, one or more devices of environment 200 may perform one or more functions described as being performed by screen capture data analyzer component 505. Additionally, or alternatively, screen capture data analyzer component 505 may be included with a device other than, or in addition to, screen capture server 250. For example, video client 215 may include screen capture data analyzer component 505 to perform one or more of the functions described herein.

Figure 6:
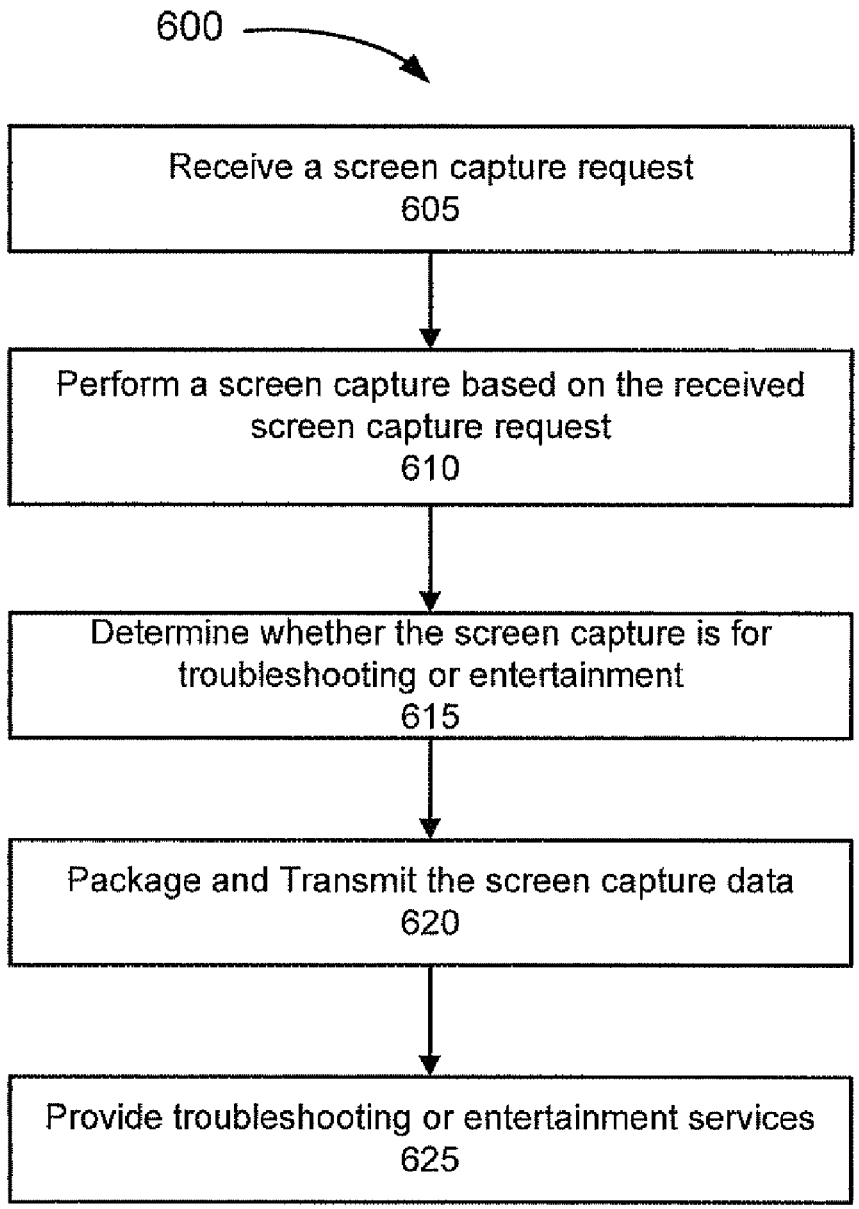
FIG. 6 flow is a diagram illustrating exemplary processes associated with the concepts described herein.

FIG. 6 is a flow diagram illustrating an exemplary process 600 that may be associated with the concepts described herein. In addition to FIG. 6, process 600 will be described in reference to exemplary environment 200 illustrated in FIG. 2.

Process 600 may begin with receiving a screen capture request (block 605). For example, a user in home network 205 may request that video client 215 perform a screen capture. For example, a user may provide an input directly to video client 215 (e.g., by pressing a button) or indirectly (e.g., via remote control 210).

A screen capture may be performed based on the received screen capture request (block 610). For example, screen capture component 405 of video client 215 may perform a screen capture process based on the user's received screen capture request. Screen capture component 405 may capture a single screenshot or multiple screenshots.

Whether the screen capture is for troubleshooting or entertainment may be determined (block 615). For example, screen capture component 405 may determine whether the screen capture is for troubleshooting or entertainment based on the received request. That is, in one implementation, video client 215 may receive a first type of input for performing a screen capture for troubleshooting, or may receive a second type of input for performing a screen capture for entertainment. In this regard, a user's selection of input may provide a basis for video client 215 to determine whether the screen capture is for troubleshooting or entertainment. For example, remote control 210 and/or video client 215 may include distinct buttons for each type of screen capture.

Additionally, or alternatively, screen capture component 405 may determine whether the screen capture is for troubleshooting or entertainment based on other criteria, such as self-diagnostic processes and/or error detection processes. In this regard, if screen capture component 405 determines that no failures or errors exist, by omission of any failure-related information, screen capture component 405 may determine that a screen capture may be for entertainment. Conversely, screen capture component 405 may determine that a screen capture may be for troubleshooting if such failures or errors exist. For example, an error detection process of video client 215 may determine a signal outage. In turn, this information may be provided to screen capture component 405. Additionally, or alternatively, screen capture component 405 may determine that a screen capture may be for entertainment if the screen capture request is received during a user's favorite show. For example, information related to a user's favorite list (e.g., a favorite show) may provide a basis for screen capture component 405 to determine that a screen capture is for entertainment. That is, it is likely that the user is performing a screen capture during his or her favorite show. In other instances, screen capture component 405 may determine that a screen capture relates to entertainment if the screen capture request occurs during video game play or some other form of video content (e.g., a music video channel) indicative of entertainment.

The screen capture data may be packaged and transmitted (block 620). For example, screen capture component 405 may generate a packet or some other type of data container/unit based on the type of screen capture. In this regard, screen capture component 405 may provide a flag, a descriptor, an identifier and/or other attributes (e.g., event level tracking) associated with the screen capture data which may be included with the screen capture data in the packet or other type of data container/unit. The flag, the descriptor, the identifier and/or other attribute information may identify the type of screen capture data as being for troubleshooting or entertainment. In other implementations, screen capture component 405 may generate a packet or some other data container/unit (e.g., in acknowledgements) to include the type of screen capture data. That is, the screen shot may be sent separately from a subsequent message identifying the type of screen capture data. Additionally, or alternatively, the type of screen capture data may be provided manually via, for example, a keypad on remote control 215. Video client 215 may forward the screen capture data and/or screen capture type information to SPN 240. In one implementation, video client 215 may forward the screen capture data and/or the screen capture type information to screen capture server 250.

Troubleshooting or entertainment services may be provided (block 625). For example, if screen capture server 250 receives the screen capture data and/or the screen capture type information, screen capture data analyzer component 505 may provide and/or facilitate troubleshooting or entertainment services.

For example, if the screen capture data corresponds to troubleshooting, screen capture data analyzer component 505 may provide the screen capture data for human analysis. In one implementation, a troubleshooting person may evaluate the screen capture data to determine the type of problem a user may be experiencing and take corrective measures.

On the other hand, if the screen capture data corresponds to entertainment, screen capture data analyzer component 505 may archive the screen capture data and allow it to be accessed (i.e., retrieved, downloaded, etc.,) by the user, friends of the user, etc. For example, a user may access screen capture server 250 via the Web, and download the screen capture data to computer system 225 and/or store the screen capture data on video client 215. In this way, a user may generate slideshows, post television screenshots on a Web page, distribute screenshots to friends and family via e-mail, etc. A television service provider may apply charges for this service (e.g., saving and/or distributing of screenshots, etc.). Additionally, or alternatively, this service may be free to premium subscribers.

Although FIG. 6 illustrates an exemplary process 600, in other implementations, fewer, additional, or different processes may be performed. For example, various messages may be communicated to a user when a screen capture request is received by video client 215. For example, video client 215 may provide one or more messages to a user (e.g., an overlay) on display 220 indicating successful capture of a screenshot, that the screenshot has been transmitted, etc. Additionally, or alternatively, screen capture server 250 may provide one or more messages to a user (e.g., an overlay) on display 220, such as a message indicating a screenshot has been received, corrective measures are taking place, call customer service or technical support, visit our web site to retrieve or review your screenshot(s), etc.

Additionally, or alternatively, screen capture server 250 may assign priority information to screen capture data that corresponds to troubleshooting. For example, if multiple screenshots are received from multiple users requesting troubleshooting services, screen capture server 250 may assign priority information to the screen capture data. In this regard, if a television problem is widespread (i.e., in relation to a certain location and/or number of television subscribers), the television service provider may correct the problem more readily, particularly if each subscriber is experiencing an identical or similar problem. In this regard, video client 215 may provide additional information associated with the screen capture data, such as channel information, television show, etc. Additionally, based on a video client's address (e.g., an Internet Protocol (IP) address), SPN 240 may determine whether a television problem is widespread, localized to a particular neighborhood, etc.

Figure 7:
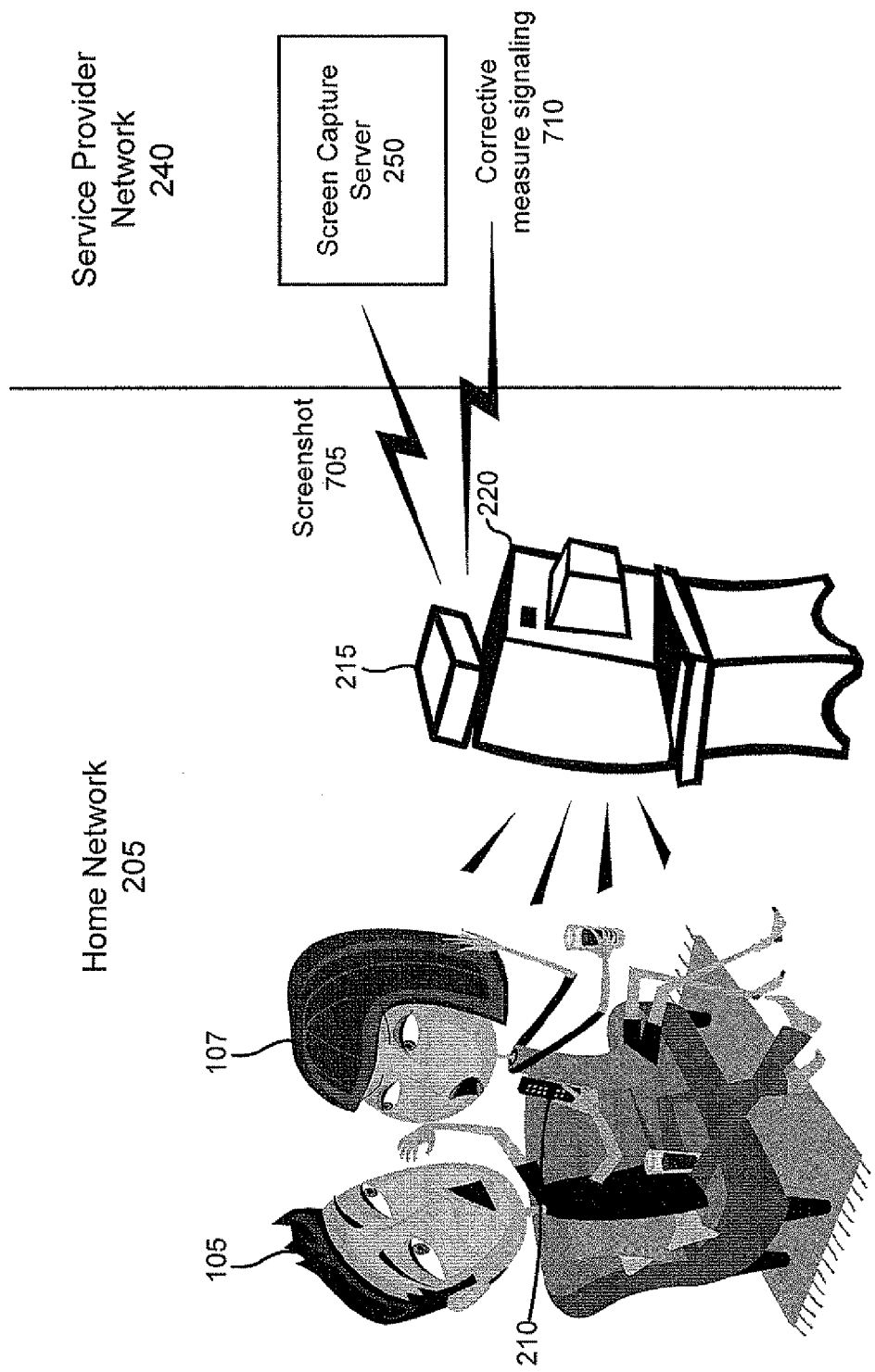
FIG. 7 is diagram illustrating an example of the concepts described herein.

FIG. 7 is a diagram illustrating an example of the concepts described herein in connection with environment 200. For purposes of discussion, assume that Michael 105 is watching a television 220 with his wife, Denise 107. While watching television 220, Michael 105 and Denise 107 notice some television reception problems. In response, Michael 105 presses a button on remote control 210 to capture a television screenshot. Video client 215 determines that screenshot 705 is for troubleshooting, and transmits screenshot 705 to screen capture server 250. Based on the content of the transmission, screen capture server 250 recognizes that screenshot 705 is for troubleshooting, and forwards screenshot 705 to a troubleshooting center (not illustrated) in SPN 240. After further analysis of screenshot 705, SPN 240 may send corrective measure signaling 710 to video client 215. Thereafter, Michael 105 and Denise 107 may continue to enjoy the television program.

The foregoing description of implementations provides illustration, but is not intended to be exhaustive or to limit the implementations to the precise form disclosed. In this regard, the concepts described herein may have broader application. For example, the video client may be configured to automatically capture a screenshot (e.g., without a user's input) and send the screenshot to a backend component of the service provider network when the video client detects a problem with a signal (e.g., a weak signal, an intermittent signal, etc.). In this regard, a user may not have to do anything for resolving troubleshooting issues since the service provider may automatically correct the problem based on the screenshot.

In addition, while a series of blocks has been described with regard to the process illustrated in FIG. 6, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method, comprising:
receiving, by a video client, a screen capture request to capture one or multiple screenshots of content from a user;
determining a type of screen capture request based on whether a first input or a second input is received by the video client;
capturing the one or multiple screenshots of content based on the screen capture request;
determining whether the one or multiple screenshots of content pertain to a troubleshooting service or an entertainment service based on the determined type of screen capture request and a favorites list associated with the user;
generating screen capture type information that indicates whether the one or multiple screenshots of content pertain to the troubleshooting service or the entertainment service based on the determining whether the one or multiple screenshots of content pertain to the troubleshooting service or the entertainment service;
analyzing at least one of the one or multiple screenshots of content or the screen capture type information; and
providing the troubleshooting service or the entertainment service to a user of the video client based on the analyzing of the at least one of the one or multiple screenshots of content or the screen capture type information.

2. The method of claim 1, wherein the determining whether comprises:
determining, by the video client, whether the one or multiple screenshots of content pertain to a troubleshooting service or an entertainment service based on error detection.

3. The method of claim 1, wherein the video client includes a set top box, and the determining whether comprises:
identifying that the content corresponds to a television program included in a user's favorite list.

4. The method of claim 1, wherein the determining whether comprises:
determining whether a failure or an error exists in relation to video reception of a display associated with the video client; and
recognizing that the one or multiple screenshots of content pertain to the troubleshooting service when the failure or the error exists.

5. The method of claim 1, wherein the providing comprises:
correcting video reception of a display associated with the video client if at least one of the one or multiple screenshots of content corresponds to the troubleshooting service based on the analyzing, or the screen capture type information corresponds to the troubleshooting service based on the analyzing.

6. The method of claim 1, wherein the providing comprises:
storing the one or multiple screenshots; and
allowing the user to access the stored one or multiple screenshots.

7. A non-transitory computer-readable storage medium having stored thereon instructions executable by at least one processor that provides video signals for a display, the computer-readable storage medium comprising:
one or more instructions for providing video content on the display;
one or more instructions for detecting a screen capture request based on a user's input;
one or more instructions for determining a type of screen capture request based on whether the user's input corresponds to a first input or a second input;
one or more instructions for capturing a video screenshot of the video content;
one or more instructions for determining whether the video screenshot pertains to a troubleshooting service or a media-related service based on the determined type of screen capture request and a favorites list associated with the user;
one or more instructions for generating screen capture type information that indicates whether the video screenshot pertains to the troubleshooting service or the media-related service based on the determining whether the video screenshot pertains to the troubleshooting service or the media-related service; and
one or more instructions for sending the video screenshot and the screen capture type information to another device to provide the troubleshooting service or the media-related service based on at least one of the video screenshot or the screen capture type information.

8. The non-transitory computer-readable storage medium of claim 7, wherein the one or more instructions for determining whether comprise:
one or more instructions for determining whether the video screenshot pertains to the troubleshooting service or the media-related service based on an absence of detecting an error or a failure.

9. The non-transitory computer-readable storage medium of claim 7, wherein the one or more instructions for determining whether comprise:
one or more instructions for determining whether the video screenshot pertains to the troubleshooting service or the media-related service based on whether the video screenshot is from a particular video program associated with the user.

10. The non-transitory computer-readable storage medium of claim 7, wherein the at least one processor is included in a set top box.

11. The non-transitory computer-readable storage medium of claim 7, the screen capture type information includes event level tracking information.

12. The non-transitory computer-readable storage medium of claim 7, further comprising:
one or more instructions for determining that a video content signal is a weak signal or an intermittent signal; and
one or more instructions for automatically capturing a video screenshot, without receiving a screen capture request from the user, based on the determining that the video content signal is a weak signal or an intermittent signal.

13. The non-transitory computer-readable storage medium of claim 7, wherein the one or more instructions for determining whether comprises:
one or more instructions for determining whether the video screenshot pertains to a troubleshooting service or a media-related service based on the video screenshot.

14. A device, comprising:
a memory to store instructions; and
a processor to execute the instructions to:
receive a selection from a user to capture a screenshot;
determine a type of screen capture selection based on whether a first input or a second input is received;
capture the screenshot;
determine whether the screenshot pertains to a troubleshooting service or a media-related service based on the determined type of screen capture selection and a favorites list associated with the user;
generate screen capture type information that indicates whether the screenshot pertains to the troubleshooting service or the media-related service; and
send the screenshot and the screen capture type information to another device to provide the troubleshooting service or the media-related service to the user.

15. The device of claim 14, wherein the selection is based on the user's selection from a television remote control.

16. The device of claim 14, wherein when determining whether the screenshot pertains to the troubleshooting service or the media-related service, the processor further executes instructions to:
determine whether an error or a failure exists with respect to a video signal received for displaying video content from which the screenshot is captured, and
determine that the screenshot pertains to the troubleshooting service if the error or the failure exists.

17. The device of claim 14, wherein the processor further executes instructions to:
receive a selection from the user to retrieve the screenshot from the other device; and
provide for display the received screenshot to the user on a display.

18. The device of claim 14, wherein the screen capture type information includes event level tracking information.

19. The device of claim 14, wherein the device is a set top box and the other device is a server.

20. A system comprising:
a video device comprising:
a memory to store instructions; and
a processor to execute the instructions to:
provide video content to a user on a display;
determine whether an error or a failure exists with respect to a video signal received for displaying the video content;
automatically capture a screenshot from the video content when it is determined that the error or the failure exists;
generate screen capture type information that indicates that the screenshot pertains to a troubleshooting service; and
output the screenshot and the screen capture type information to a server to correct video reception on the display.

21. The system of claim 20, further comprising the server, wherein the server comprises:
a memory to store instructions; and
a processor to execute the instructions to:
automatically correct the error or the failure based on the screenshot and the screen capture type information.

22. The system of claim 21, wherein the processor of the video device further executes instructions to:
output channel information pertaining to the screenshot; and
the processor of the server further executes instructions to:
determine whether the error or the failure is occurring with other users; and
assign a priority to correct the error or the failure when it is determined that the error or the failure is occurring with other users.

* * * * *